United States Patent [19]

Nishina et al.

[11] Patent Number: 5,349,049
[45] Date of Patent: Sep. 20, 1994

[54] METHOD OF PRODUCTION OF POLYVINYL CHLORIDE RESIN FOR PASTE PROCESSING

[75] Inventors: Masaaki Nishina, Yokohama; Osamu Ozaki, Himi, both of Japan

[73] Assignee: Nippon Zeon Co., Ltd., Tokyo, Japan

[21] Appl. No.: 40,192

[22] Filed: Mar. 31, 1993

[30] Foreign Application Priority Data

Mar. 31, 1992 [JP] Japan .................................. 4-105770

[51] Int. Cl.$^5$ ............................................. C08F 6/16
[52] U.S. Cl. ............................ 528/485; 528/486; 528/487
[58] Field of Search ................... 528/485, 486, 487

[56] References Cited

U.S. PATENT DOCUMENTS

| | | | |
|---|---|---|---|
| 2,674,585 | 4/1954 | Condo et al. | 528/486 |
| 3,052,663 | 9/1962 | Bodlaender et al. | 528/486 |
| 4,803,260 | 2/1989 | Nishina et al. | 528/487 |

OTHER PUBLICATIONS

Hawley's Condensed Chemical Dictionary, Van Nostrand Reinhold, N.Y., 1987, 11th ed., pp. 512 & 514.
Grant & Hackh's Chemical Dictionary, McGraw-Hill, N.Y., 1987, 5th Ed., p. 238.

*Primary Examiner*—Joseph L. Schofer
*Assistant Examiner*—Tom Weber
*Attorney, Agent, or Firm*—Millen, White, Zelano & Branigan

[57] ABSTRACT

A method of production of polyvinyl chloride resin for paste processing comprises recovering in 98% or more the polyvinyl chloride resin from an aqueous dispersion of the polyvinyl chloride resin for paste processing as aggregates by adding an organic fluid which is at most barely soluble in water and does not dissolve or swell the polyvinyl chloride resin to the aqueous dispersion in the presence of an aggregating agent, followed by separating the aggregated polyvinyl chloride resin particles from the aqueous phase of the aqueous dispersion. By the addition of the aggregating agent, dispersion of the resin particles into a medium is improved, fluidity of a sol thereof and the physical properties of molded articles formed therefrom are improved and blocking during the drying process is prevented.

16 Claims, No Drawings

METHOD OF PRODUCTION OF POLYVINYL CHLORIDE RESIN FOR PASTE PROCESSING

BACKGROUND OF THE INVENTION

1. Field of the invention

The present invention relates to a novel method of production of polyvinyl chloride resin for paste processing.

2. Description of the prior art

Paste processing of a polyvinyl chloride resin comprises the preparation of a liquid plastisol by mixing a polyvinyl chloride plastisol prepared specifically for the paste processing with compounding ingredients, such as plasticizers, stabilizers and, when necessary, pigments, fillers and the like, curing of the liquid plastisol by a suitable method, such as molding, coating, dipping and the like, and melting by heating followed by solidification of the plastisol to obtain a cured product.

The flow property of the plastisol naturally affects the workability of the paste processing to a great extent and much effort has actually been paid for improvement of the flow property.

Along with the flow property of the plastisol, the degree of dispersion of powder compounding components into the liquid compounding components affects the properties, particularly appearance and strength, of the molded product to a great extent.

A plastisol contains aggregated resin particles formed by the aggregation of a number of small particles of the resin. When the plastisol contains rough and large aggregates of the resin particles without being dispersed into small particles, the flow property of the plastisol is adversely affected and furthermore problems, such as clogging of the plastisol during transportation, streaking during coating, rough surfaces on the molded product, decrease in gloss of the cured product, decrease of strength in the cured product and like other problems, arise.

To overcome the problems of the paste processing described above, it is proposed that the material resin is supplied as a very fine powder which completely passes a sieve of 325 mesh of Tyler Standard Sieves. The fine powder is prepared by polymerizing vinyl chloride or a monomer mixture containing vinyl chloride as the main component in the presence of a radical generating polymerization initiator and an emulsifier by the method of emulsion polymerization or by the method of microsuspension polymerization. An aqueous suspension of spherical resin particles having a diameter of 0.05 to 5 μm is obtained by the polymerization, which is then dried by spraying.

However, conventional resins prepared by the above method have problems caused by the fine powdery form of the resin, such as deteriorated working conditions because of scattering of the powder during charging into a bag, discharging from the bag for production of the plastisol and mixing in the production of the plastisol and difficulties in automatic weighing and automatic transportation because of the inferior flow property.

For overcoming the problems described above, a method of production of vinyl chloride resin for paste processing in which the polyvinyl chloride resin is recovered from a dispersion by separating it as aggregates from the aqueous phase with addition of an organic fluid which is at least barely soluble in water and does not dissolve or swell the polyvinyl chloride resin and then dried with or without granulation in advance is proposed in Japanese Patent Publication Heisei 1-42282.

Though the problems described above are improved, other problems, such as formation of blocking during the drying process, inhomogeneous drying and formation of particulate protrusions at the surface of the cured product by the presence of larger particles, are caused by the formation of too strong aggregates of the wet resin. The yield of recovery of the resin powder is about 96% at most and the 4% rest of the resin which is lost material creates a serious problem for a large production. It is absolutely necessary that the resin left in the aqueous phase is additionally effectively recovered.

SUMMARY OF THE INVENTION

The present invention accordingly has an object to provide a method of production of the polyvinyl chloride resin for paste processing having excellent dispersing property with easy decomposition into small particles with a high yield of recovery without causing blocking during the drying process.

Extensive investigations undertaken by the present inventors with the objects described above lead to a discovery that, when the polyvinyl chloride resin is recovered by separating it as aggregates from the aqueous phase with addition of an organic fluid which is barely soluble in water and does not dissolve or swell the polyvinyl chloride resin in the presence of an aggregating agent, the yield of recovery of the resin is increased to 98% or more because of the enhanced aggregation by the organic fluid and an additional recovery process of the resin is not necessary. At the same time, the aggregated particles are unexpectedly more easily decomposed and a good dispersion is formed more easily from the wet resin aggregates obtained after the recovery in the presence of the aggregating agent.

Thus, the method of production of polyvinyl chloride resin for paste processing comprises recovering the polyvinyl chloride resin from an aqueous dispersion of the polyvinyl chloride resin for paste processing as aggregates by adding an organic fluid, which is at most barely soluble in water and does not dissolve or swell the polyvinyl chloride resin, to the aqueous dispersion in the presence of an aggregating agent, followed by separating the polyvinyl chloride resin from the aqueous phase of the aqueous dispersion.

Other and further objects, features and advantages of the invention will appear more fully from the following description.

DETAILED DESCRIPTION OF THE INVENTION

The method of the invention comprises essentially the following processes: process 1 in which an aggregating agent is added to and mixed with an aqueous dispersion of the polyvinyl chloride resin; process 2 in which an organic fluid which is at most barely soluble in water is added to and mixed with the aqueous dispersion of the resin to form aggregates of the resin by the organic fluid acting as a binder; process 3 in which the aqueous phase is removed from the aqueous dispersion of the aggregates of the resin; and process 4 in which the aggregates of the resin, separated from the aqueous phase are dried.

The aqueous dispersion of polyvinyl chloride resin for paste processing utilized in the invention is an aqueous dispersion of a homopolymer of vinyl chloride or a copolymer of vinyl chloride comprising vinyl chloride as the main component thereof, generally in an amount of 70 weight % or more, which is prepared by conventional emulsion polymerization or micro suspension polymerization. Examples of the vinyl chloride copolymers are copolymers with olefinic monomers, such as vinyl acetate, vinylidene chloride, ethylene, propylene, butene, acrylonitrile, esters of acrylic acid, esters of methacrylic acid, maleic acid and the like. Aqueous dispersions of polyvinyl chloride which can be utilized in conventional paste processing are utilized without particular restriction. Polyvinyl chloride resins utilized as filler may be present in the resin of the invention when necessary.

Any aqueous dispersion comprising 10 to 70 weight % of the polyvinyl chloride resin can be utilized in the invention. The aqueous dispersion prepared by the polymerization can be advantageously utilized without additional treatment. However, when necessary, a part of water in the dispersion may be removed or a suitable amount of water may be added to the dispersion. When the content of the polyvinyl chloride is less than 10 weight %, too much water needs to be removed in comparison with the amount of the product and the process is not economically advantageous and, when the content of the polyvinyl chloride is more than 70 weight %, viscosity of the mixture of the aqueous dispersion and the organic fluid is increased dramatically, which causes difficulty on the operation of the processes.

The aggregating agent utilized in the method of the invention is an agent having the property of forming aggregates from dispersed particles, such as inorganic low molecular weight aggregating agents, inorganic macromolecular aggregating agents, organic macromolecular nonionic aggregating agents, organic macromolecular anionic aggregating agents and organic macromolecular cationic aggregating agents.

Examples of the inorganic low molecular weight aggregating agent are aluminum sulfate, aluminum chloride, aluminum sulfate containing iron, ammonium alum, potassium alum, ferrous sulfate, ferric sulfate, ferric chloride, cuprous chloride, zinc chloride, zinc sulfate, magnesium carbonate, magnesium oxide, magnesium sulfate, sodium aluminate, calcium chloride, sodium silicate and the like.

Examples of the inorganic macromolecular aggregating agent are polyaluminum chloride, polyaluminum sulfate, polyferric chloride, polyferric sulfate and the like.

Examples of the organic macromolecular nonionic aggregating agent are polyacrylamide, polyethylene oxide, polyvinyl alcohol, starch and the like.

Examples of the organic macromolecular anionic aggregating agent are polysodium acrylate, polysodium vinylsulfonate, sodium of alginate, partial hydrolyzates of polyacrylamide, copolymers of acrylamide and acrylic acid, partially sulfomethylated products of polyacrylamide, carboxymethyl cellulose and the like.

Examples of the organic macromolecular cationic aggregating agent are polyethyleneimine, condensation products of dicyandiamide and formaldehyde, polymethacrylic esters, polyacrylic esters, polyamines and the like.

The concentration of the aggregating agent in the aqueous dispersion of the resin is suitably selected according to the aggregating activity of the aggregating agent. It is generally in the range from 10 to 1000 ppm and preferably in the range from 60 to 800 ppm based on the total amount of the aqueous dispersion. It is preferable for exhibiting the desirable physical properties of the resin that the concentration of the aggregating agent is kept at the low end of the range where the effect of the agent is exhibited.

The organic fluid added to the aqueous dispersion of polyvinyl chloride resin is at most barely soluble in water and does not dissolve or swell the resin during the separation and recovery process of the resin. The organic fluid generally has a melting point of 20° or lower and a boiling point at the atmospheric pressure which is not less than the temperature of the separation and recovery process and preferably 200° C. or higher. When an organic fluid having a boiling point which is lower than the temperature of the separation and recovery process is utilized, the organic fluid evaporates during the process and an additional apparatus is required for recovery of the organic fluid, thus rendering the process economically disadvantageous. The organic fluid may be utilized singly or as a mixture of two or more kinds. When two or more kinds of the organic fluid are utilized as a mixture, the mixture preferably has the property described above and the component fluids are not necessarily required to have the property described above.

The organic fluid utilized in the invention is required to be at most barely soluble in water by the following reasons. Firstly, when the organic fluid is mixed with the aqueous dispersion and then separated from the aqueous phase, the amount of the organic fluid separated with the aqueous part is kept low to prevent loss of the organic fluid and to reduce the cost of treatment of the waste water. Secondly, to form aggregates of the resin particles dispersed in water by the action of layer of the organic fluid formed between the particles, it is necessary that the organic fluid is present on the surface of the particle of the resin to prevent water from being in direct contact with the particles. When the organic fluid utilized in the invention dissolves or swells the resin at the temperature of the separation and recovery process, the resin particles are deformed or modified and the process is not advantageous. Because a major part of the organic fluid utilized in the invention remains in the resin of the product article, organic fluids having adverse effects on workability and operability during the paste processing and on the quality of the product article must be avoided. From the reasons described above, it is natural and advantageous that liquid compounding ingredients generally utilized for the paste processing are adopted.

Examples of the organic fluid of the invention are plasticizers, process oils, lubricants and the like as shown in the following:

(1) Alkyl phthalate plasticizers, such as dioctyl phthalate, dinonyl phthalate, butyl lauryl phthalate, methyl oleyl phthalate and the like;
(2) Aromatic carboxylic acid ester plasticizers, such as trioctyl trimellitate, diethyleneglycol dibenzoate and the like;
(3) Aliphatic dibasic acid ester plasticizers, such as dioctyl adipate, dibutyl sebacate, dioctyl tetrahydrophthalate and the like;
(4) Phosphoric acid ester plasticizers, such as trioctyl phosphate, trichloroethyl phosphate and the like;
(5) Aliphatic glycol ester plasticizers, such as diethyleneglycol dicaprylate, 1,4-butyleneglycol di-2-ethylhexanoate and the like;

(6) Polyester plasticizers;
(7) Secondary plasticizers, such as aliphatic esters like butyl oleate, methyl acetylricinolate, 2,2,4-trimethyl-1,3-pentanediol diisobutyrate and the like, epoxy plasticizers like epoxidized soy bean oil, octyl epoxystearate and the like, chlorinated paraffin plasticizers like chlorinated aliphatic fatty acid methyl esters, chlorinated paraffin and the like, aliphatic dibasic acid esters like dioctyl succinate and the like, dioctyl succinate and the like other plasticizers;
(8) Diluents, such as petroleum diluents like mineral spirit, mineral terpene and the like, long chain alkylbenzene diluents like dodecylbenzene and the like and the like other diluents; and
(9) Liquid lubricants, such as higher alcohols, liquid paraffin, alkyl esters of higher fatty acids and the like.

The amount of the organic fluid added to the aqueous dispersion can be selected suitably according to the concentration of the resin in the aqueous dispersion and to the required properties of the dried resin as the product within the range from 0.5 to less than 15 weight parts per 100 weight parts of the resin in the aqueous dispersion. When the amount of the organic fluid is 15 weight parts or more, the safety of the operation during the mixing with the resin is not maintained well and blocking during storage tends to take place. When the concentration of the resin in the aqueous dispersion is more than 40%, it is preferred that the amount of the organic fluid added to the aqueous dispersion is kept to 10 weight parts or less so that the continuous process is not disrupted by the formation of excessively large and coarse resin aggregates in the mixture solution. When the concentration of the resin in the aqueous dispersion is approximately in the range from 10 to 20%, it is effective that the organic fluid is added in an amount of 10 weight parts or more so that the efficiency of the formation of the aggregates is enhanced.

Mixing of the organic fluid and the aqueous dispersion of the resin in the presence of the aggregating agent according to the method of the invention is conducted at such a temperature that the organic fluid utilized does not dissolve or swell the resin and within the range from 20° to 70° C. The temperature is preferably 50° C. or lower because a higher temperature increases the rate of swelling of the resin by the organic fluid. When the temperature is higher than 70° C., absorption of the organic fluid into the resin is further enhanced and, furthermore, the resin is softened to form a block. It is thus highly probable that the product made at a temperature higher than 70° C. is not suitable for paste processing.

In the method of the invention, the order of the addition of the aggregating agent and the organic fluid to the aqueous dispersion of the resin is not particularly limited. When the mixture is stirred sufficiently, the effect of the order of the addition is absent. As the method of mixing after the aggregating agent and the organic fluid are added to the aqueous dispersion of the resin, conventional methods can be adopted. However, because the degree of the mixing greatly affects the efficiency of the aggregation of the resin by the aggregating agent and the organic fluid, it is preferred that the mixing power of the mixing apparatus per unit volume is 1 KW/M$^3$ (1 kilowatt per 1 cubic meter) or more and the product of the mixing power and the mixing time is 4 KW.Hr/M$^3$ or more. As the apparatus of mixing, a high speed rotatory continuous mixer and a multi-blade continuous mixing vessel are preferably utilized because of homogeneity and continuity of the mixing. However, conventional stirred vessel mixers and static mixers may be utilized as well.

Separation of the aqueous phase from the resin aggregates formed by the effect of the organic fluid can be conducted by utilizing conventional methods suitably selected according to the condition of the resin mixture formed. The temperature of the separation is preferably in the range from 20° to 70° C. to prevent softening and blocking of the resin. When the separation is conducted at a low resin concentration with a relatively large amount of the organic fluid (in the range from 5 to less than 15 weight % of the resin) for a long mixing time, the aggregates can be obtained as spherical particles having relatively large diameters and high strengths and the aqueous part can be separated by screening and the like methods. When the separation is conducted at a higher concentration of the resin with a smaller amount of the added organic fluid, the aggregates obtained have smaller diameters and a significant portion of the resin particles are not aggregated. In the latter condition, methods like centrifugal separation can be utilized.

The resin particles separated at the separation process are sent to the drying process and the organic fluid and the remaining water are removed. In the drying process, it is necessary that the condition of the operation is selected suitably so that strength of the aggregation and blocking of the resin do not have an adverse effect on the dispersion during the paste processing. The temperature of the resin treated in the drying process is 70° C. or lower and preferably 50° C. or lower. As the drying apparatus, a vacuum dryer is preferred to keep the resin to be dried at a low temperature. When the particle size is distributed rather uniformly, a fluidized bed drier is preferred because of the lower temperature and the increased efficiency of the operation. However, various kinds of other conventional drying apparatuses can be utilized as well. Resins having random shapes or broad distribution of the particle size can be obtained as the product by suitably selecting the apparatus of the drying. The shape of the resin particles can also be made uniform by incorporation of a pelletizing apparatus like an extrusion pelletizer into the drying process. In this case again, care must be taken so that the dispersion during the paste processing is not adversely affected by melting of the resin or by absorption of the organic fluid under heat and pressure during the pelletizing process. According to the method of production of the invention, the resin aggregates are easily decomposed by the effect of addition of the aggregating agent and the dispersion property as the particles for the past processing is improved.

When the method of the invention is conducted as an industrial process, the presence of the aggregating agent enhances the yield of recovery of the resin by the organic fluid in process 2 because of the proper effect of the aggregating agent.

It is important for increasing the yield of recovery of the resin that the amount of water remaining in the resin in the process 3 is kept low. The kind of the organic fluid must be selected suitably for this purpose in process 2. It is also important for increasing the yield of recovery that various factors of mixing affecting the aggregation of the resin are optimized by conventionally available methods. Suitable selection of the separation apparatus in the process 3 is also desirable for the same purpose.

In the method of the invention, the recovery yield of the resin can be 98% or more, particularly 99% or more, without recovering the residual resin in the aqueous phase in process 3, by selecting the conditions of the recovery suitably as described above unlike conventional methods.

The addition of the aggregating agent exhibits an additional effect of preventing blocking of the dried particles in process 4.

In the method of the invention, only a small amount of the resin is left remaining in the aqueous phase and recovery of the resin therefrom is not necessary. However, for reduction of cost accompanied with the treatment of waste water, a process for complete recovery of the residual resin and the organic fluid from the aqueous part separated in process 3 may be added to the process of the invention. The residual resin thus recovered may be disposed as an industrial waste or recycled by adding it to the resin in the method of the invention when the purity of the recovered residual resin is good enough to do so.

The residual resin can be recovered by a physical method of recovery, such as a centrifugal method, a floatation method like aeration, a coagulation method by addition of a coagulating agent and a method of ultrafiltration.

As the method of recovery of the residual resin from the aqueous part, the coagulation method can be adopted in the same way as process 1. The organic fluid emulsion remaining in the aqueous part is coagulated together with the resin and the content of substances other than the resin in the thus obtained coagulated product is increased. When the cake or the mud-like material recovered from the aqueous phase is utilized as a part of the resin product, it is preferably recycled to process 1 or process 2. In the method of recovery of the residual resin in the aqueous part by coagulation, the aggregating agent described above in the method of the production of the invention can be utilized.

When the recovery of the residual resin in the aqueous phase is additionally adopted in the process of the invention, the method of ultrafiltration using a semipermeable membrane can be favorably utilized. In the ultrafiltration, the rate of filtration is varied to a great degree depending on the concentration of the dispersed material in the dispersion to be treated. The concentration of the dispersed material in the aqueous part to be treated in the invention is 1% at most, which is within the general range of the concentration effectively treated by the ultrafiltration. Emulsifiers and other low molecular weight water soluble components are removed from the resin to the aqueous filtrate and the resin recovered from the aqueous part does not contain undesirable substances. Mixing of the thus recovered resin from the aqueous phase to the main resin of the process does not adversely affect the water resistance and the transparency of the molded product. Thus, the method is advantageous and can be favorably adopted. The resin obtained by the method can be directly added to the drying process of the invention.

To summarize the advantages obtained by the invention: the yield of the aggregated resin particles can be increased to 98 % or more by the addition of the aggregating agent; the resin particles obtained are easily decomposed; the property of dispersion into a medium is improved; the fluidity of the sol and physical properties of the molded articles are improved; and blocking during the drying process is prevented.

The invention will be understood more readily with reference to the following examples; however, these examples are intended to illustrate the invention and are not to be construed to limit the scope of the invention.

Methods of testing in Examples and Comparative Examples are described in the following:

[Properties of the resin as powder]

Rest angle shows degree of fluidity of a powder and a smaller value means larger fluidity.

Bulk density shows apparent density of powder and a larger value means better handling property.

[Dispersion property of sol]

The property was evaluated by measuring the NF value (North Finess value) of resin particles in a sol prepared by mixing 50 g of a resin and 30 g of di-2-ethylhexylphthalate in a grinder.

[Method of measurement of the NF value]

A sample of sol is placed on the base line of a steel gauge which is at the maximum depth of a ditch of the gauge having 0.5 inch width and the ditch of linearly varying depth. The sample is scraped to the direction of shallower depth by a scraper and the position where many points of rough aggregated particles are observed is recorded. The number 0 means the roughest and the number 8 means the finest. The numbers 8, 4 and 0 correspond to diameters of the particle of 0, 51 and 102 $\mu$m, respectively. A larger NF value means that the particles are finer and dispersed better.

[Method of testing of easiness of decomposition of a wet cake]

Into a Tyler standard sieve of 12 mesh, 10 grams of a wet cake were placed and treated with a tap shaker for 1 minute. The degree of decomposition of the wet cake was evaluated by the following criterion.

◯: all passed the sieve.

△: less than 5 g of the cake remaining in the sieve.

x: 5 g or more of the cake remaining in the sieve.

[Method of measurement of amount of rough particles]

Into a Tyler standard sieve of six mesh, 25 g of a resin powder after drying were placed and treated with a tap shaker for 10 minutes. Weight of the resin powder remaining on the sieve was measured and recorded as the ratio to the original weight of 25 g.

[Yield of recovery]

Yield of recovery=weight of the resin obtained after drying/weight of the resin in the aqueous dispersion before the aggregation×100

The yield and the amount of recovery do not include the resin recovered from the separated aqueous part.

EXAMPLE 1

An aqueous dispersion of polyvinyl chloride for paste processing was passed through a screen attached with a sieve of 250 $\mu$m mesh and water was added to the screened aqueous dispersion to adjust the concentration of the solid component to 35 weight %. Into a mixing vessel of 20 cm diameter and 12 liter inner volume, 11000 g (solid PVC=11000×0.35=3850 g) of the aqueous dispersion and 12 g of a 10% aqueous solution of polyaluminum chloride were charged. As soon as stirring was started at 1100 rpm, diisononyl phthalate was injected into the bottom of the mixing vessel for 60 minutes at a rate of 3.2 g per minute (3.2×60=192 g). The mixture was further stirred for 60 minutes at 1100 rpm to obtain an aqueous dispersion of resin particles. The dispersion thus obtained was filtered in a vacuum using a filter cloth having an air passage of 80 cc/sec.cm² to separate the resin particles and 5750 g of wet particles were obtained. The wet particles were dried in a small fluidized bed dryer in a stream of 40° C. air to obtain 4020 g of polyvinyl chloride resin particles (A).

EXAMPLE 2

An aqueous dispersion of polyvinyl chloride for paste processing was passed through a screen attached with a sieve of 250 μm mesh and the concentration of the solid component of the aqueous dispersion passed through the screen was adjusted to 35 weight %. Into a mixing vessel of 20 cm diameter and 12 liter inner volume, 11000 g of the aqueous dispersion and 65 g of a 10 % aqueous solution of aluminum sulfate were charged. As soon as stirring was started at 1100 rpm, di-2-ethylhexyl phthalate was injected into the bottom of the mixing apparatus for 30 minutes at a rate of 7.7 g per minute. The mixture was further stirred for 60 minutes at 1100 rpm to obtain an aqueous dispersion of resin particles. The dispersion thus obtained was filtered in a vacuum using a filter cloth having an air passage of 80 cc/sec.cm² to separate the resin particles and 5150 g of wet particles were thus obtained. The wet particles were dried in a small fluidized bed dryer in a stream of 40° C. air to obtain 3500 g of polyvinyl chloride resin particles (B).

EXAMPLE 3

An aqueous dispersion of polyvinyl chloride for paste processing was passed through a screen attached with a sieve of 250 μm mesh and the concentration of the solid component of the aqueous dispersion passed through the screen was adjusted to 40 weight %. Into a mixing vessel of 20 cm diameter and 12 liter inner volume, 11000 g of the aqueous dispersion and 650 g of a 1% aqueous solution of polyacrylamide were charged. As soon as stirring was started at 1100 rpm, diisodecyl phthalate was injected into the bottom of the mixing vessel for 40 minutes at a rate of 11 g per minute. The mixture was further stirred for 50 minutes at 1100 rpm to obtain an aqueous dispersion of resin particles. The dispersion thus obtained was filtered in a vacuum using a filter cloth having an air passage of 80 cc/sec.cm² to separate the resin particles and 6870 g of wet particles were thus obtained. The wet particles were dried in a small fluidized bed dryer in the air stream of 40° C. to obtain 4810 g of polyvinyl chloride resin particles (C).

Comparative Example 1

Employing the same operations and the same materials as those in Example 1 except that polyaluminum chloride was not used, 5470 g of wet resin particles were obtained. The wet resin particles were dried in a small fluidized bed dryer in a stream of 40° C. air to obtain 3830 g of polyvinyl chloride resin particles (D).

Comparative Example 2

Employing the same operations and the same materials as those in Example 2 except that aluminum sulfate was not used, 4720 g of wet resin particles were obtained. The wet resin particles were dried in a small fluidized bed dryer in a stream of 40° C. air to obtain 3400 g of polyvinyl chloride resin particles (E).

Comparative Example 3

Employing the same operations and the same materials as those in Example 3 except that polyacrylamide was not used, 6400 g of wet resin particles were obtained. The wet resin particles were dried in a small fluidized bed dryer in a stream of 40° C. air to obtain 4670 g of polyvinyl chloride resin particles (F).

The results of the above Examples and Comparative Examples are listed in Table 1.

TABLE 1

| Example | 1 | 2 | 3 | — | — | — |
|---|---|---|---|---|---|---|
| Comparative Example | — | — | — | 1 | 2 | 3 |
| resin particles | A | B | C | D | E | F |
| amount of added aggregating agent (ppm) | ca 300 | ca 2000 | ca 1500 | 0 | 0 | 0 |
| yield of recovery (%) | 99.4 | 99.0 | 99.2 | 95.0 | 96.1 | 96.4 |
| ease of decomposition of wet cake after separation of aqueous phase | ◯ | ◯ | ◯ | X | X | X |
| properties of resin as powder | | | | | | |
| rest angle | 37 | 38 | 36 | 38 | 39 | 37 |
| bulk density | 0.52 | 0.52 | 0.53 | 0.51 | 0.51 | 0.52 |
| content of coarse particles (%) | 1.2 | 1.2 | 1.5 | 5.5 | 5.8 | 6.5 |
| dispersion property of sol (NF value) | 4.0 | 4.0 | 4.5 | 4.0 | 4.0 | 4.5 |

While the invention has been particularly shown and described with reference to preferred embodiments thereof, it will be understood by those skilled in the art that the foregoing and other changes in form and details can be made therein without departing from the spirit and scope of the invention.

What is claimed is:

1. In a method for the production of particulate polyvinyl chloride resin suitable for paste processing in which an aqueous polyvinyl chloride resin dispersion containing 10 to 70 parts of the polyvinyl chloride resin per 100 parts of the aqueous dispersion is separated from the aqueous phase and recovered, the improvement which comprises adding to the aqueous dispersion and mixing therewith at a temperature from 20° to 50° C. (a) an amount from 0.5 to less than 15 weight parts per 100 weight parts of resin in the aqueous dispersion of an organic fluid which is at most barely soluble in water and does not dissolve or swell the polyvinyl chloride resin and has a boiling point of at least 200° C. and (b) an aggregating agent, prior to separating the particulate polyvinyl chloride resin from the aqueous phase of the aqueous dispersion.

2. A method as claimed in claim 1 wherein the polyvinyl chloride resin is recovered in a yield of 98% or more.

3. A method as claimed in claim 1 wherein the aggregating agent and the organic fluid is added to and mixed with the aqueous dispersion to form aggregates of the polyvinyl chloride resin, the aqueous phase of the aqueous dispersion is removed to separate the aggregates of the polyvinyl chloride resin therefrom and the aggregates of the polyvinyl chloride resin separated from the aqueous part are dried.

4. A method as claimed in claim 1 wherein the aggregating agent is selected from the group consisting of inorganic low molecular weight aggregating agents, inorganic macromolecular aggregating agents, organic macromolecular nonionic aggregating agents, organic macromolecular anionic aggregating agents and organic macromolecular cationic aggregating agents.

5. A method as claimed in claim 4 wherein the concentration of the aggregating agent in the aqueous dispersion is in the range from 10 to 1000 ppm based on the total amount of the aqueous dispersion.

6. A method as claimed in claim 1 wherein the concentration of the aggregating agent in the aqueous dispersion is from 60 to 800 ppm based on the total amount of the aqueous dispersion.

7. A method as claimed in claim 1 wherein the organic fluid has a melting point of 20° C. or lower and a boiling point at the atmospheric pressure which is not less than the maximum temperature reached during the recovery of the aggregated polyvinyl chloride resin.

8. A method as claimed in claim 1 wherein the aggregating agent and the organic fluid are mixed with the aqueous dispersion with a mixing power per unit volume of the mixing apparatus, in which they are made of at least 1 kilowatt per cubit meter or more.

9. A method of claim 1, wherein the organic fluid is an alkyl phthalate aromatic carboxylic acid ester, an ester of an aliphatic dibasic acid, a phosphoric acid ester, an aliphatic glycol ester or a secondary plasticizer.

10. A method of claim 1, wherein the aggregating agent is a low molecular weight inorganic compound selected from the group consisting of aluminum sulfate containing iron, ammonium alum, potassium alum, ferrous sulfate ferric sulfate, ferric chloride, cuprous chloride, zinc chloride, zinc sulfate, magnesium carbonate, magnesium oxide, magnesium sulfate, sodium aluminate, calcium chloride and sodium silicate, or a macromolecular weight inorganic compound selected from the group consisting of polyaluminum chloride, polyaluminum sulfate, polyferric chloride, polyferric sulfate, or a macromolecular weight nonionic organic compound selected from the group consisting of polyacrylamide, polyethylene oxide, polyvinyl alcohol and starch, or a macromolecular anionic organic compound selected from the group consisting of polysodium acrylate, polysodium acrylate, polysodium vinylsulfonate, sodium alginate, partial hydrolyzates of polyacrylamide, copolymers of acrylamide and acrylic acid, partially sulfomethylated products of polyacrylamide or carboxymethyl cellulose, or a macromolecular cationic organic compound selected from the group consisting of polyethyleneimine, condensation products of dicyandiamide and formaldehyde, polymethacrylic esters, polyacrylic esters and polyamines.

11. A method of claim 10, wherein the amount of the aggregating agent is from 10 to 1,000 ppm based on the total amount of the aqueous dispersion.

12. A method of claim 11, wherein the organic fluid is an alkyl phthalate aromatic carboxylic acid ester, aliphatic dibasic acid ester, phosphoric acid ester, aliphatic glycol ester or secondary plasticizer.

13. A method of claim 1, wherein the concentration of the resin in the aqueous dispersion is from 10 to 20% and the amount of organic fluid added thereto is from 10 to less than 15 weight parts per 100 weight parts of resin.

14. A method of claim 1, wherein the concentration of the resin in the aqueous dispersion is more than 40% and the amount of organic fluid added thereto is 10 parts or less per 100 weight parts of resin.

15. A method of claim 1, wherein the organic fluid is a phthalate plasticizer.

16. A method of claim 15, wherein the organic phthalate plasticizer is diisononyl phthalate, di-2-ethylhexyl phthalate or diisodecyl phthalate.

* * * * *